United States Patent
Wang et al.

(10) Patent No.: US 9,237,553 B2
(45) Date of Patent: Jan. 12, 2016

(54) COEXISTENCE OF PRIORITY BROADCAST AND UNICAST IN PEER-TO-PEER NETWORKS

(75) Inventors: Ying Wang, Easton, PA (US); Sundar Subramanian, Somerville, NJ (US); Xinzhou Wu, Monmouth Junction, NJ (US); Junyi Li, Chester, NJ (US); Thomas J. Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 13/454,963

(22) Filed: Apr. 24, 2012

(65) Prior Publication Data

US 2013/0010767 A1 Jan. 10, 2013

Related U.S. Application Data

(60) Provisional application No. 61/505,464, filed on Jul. 7, 2011.

(51) Int. Cl.
*H04W 72/00* (2009.01)

(52) U.S. Cl.
CPC ................................. *H04W 72/005* (2013.01)

(58) Field of Classification Search
CPC ....... H04W 4/06; H04W 4/005; H04W 16/02; H04W 24/02; H04W 28/08; H04W 36/26; H04W 40/02; H04W 40/12; H04W 52/02; H04W 52/0216; H04W 52/0229; H04W 72/00; H04W 72/005; H04W 72/04; H04W 72/042; H04W 72/044; H04W 72/0453; H04W 72/0446; H04W 72/12; H04W 72/1257; H04W 76/021; H04W 84/18; H04W 88/04; H04W 92/18; H04L 45/04; H04L 5/0005; H04L 5/0007; H04L 5/0035; H04L 5/0096; H04L 12/18; H04L 47/125; H04L 47/805; H04L 27/2646; H04L 65/80; H04L 65/4076; H04L 67/10; H04L 67/104; H04L 2001/0093

USPC ......... 370/312, 329, 390, 252, 328, 254, 330, 370/221, 228, 229, 230, 236, 280, 311, 336, 370/350, 392
See application file for complete search history.

(56) References Cited

U.S. PATENT DOCUMENTS 6,515,991 B1 * 2/2003 McKeown ..................... 370/390
7,423,973 B2 * 9/2008 Chen et al. ..................... 370/238

(Continued)

FOREIGN PATENT DOCUMENTS

EP 1351437 A1 * 10/2003
EP 1850560 A1 10/2007

(Continued)

OTHER PUBLICATIONS

Yang, Xue, and Nitin H. Vaidya. "Priority scheduling in wireless ad hoc networks." In Proceedings of the 3rd ACM international symposium on Mobile ad hoc networking & computing, pp. 71-79. ACM, 2002.*

(Continued)

*Primary Examiner* — Benjamin H Elliott, IV
*Assistant Examiner* — Eric Nowlin
(74) *Attorney, Agent, or Firm* — James O'Hare; Kevin T. Cheatham

(57) ABSTRACT

A method, a computer program product, and an apparatus are provided. In one configuration, the apparatus transmits a first broadcast signal including information indicating an intention to use a unicast resource for a broadcast. In addition, the apparatus transmits a second broadcast signal in the unicast resource. In another configuration, the apparatus, which is a first wireless device, receives a first broadcast signal from a second wireless device including information indicating an intention to use a unicast resource for a broadcast. In addition, the apparatus receives a first scheduling signal from the second wireless device in a scheduling resource. The first scheduling signal is for indicating a second intention to use the unicast resource for transmitting a second broadcast signal. Furthermore, the apparatus refrains from transmitting a second scheduling signal in the scheduling resource in response to the first scheduling signal.

40 Claims, 16 Drawing Sheets

(56) References Cited

U.S. PATENT DOCUMENTS

| | | | |
|---|---|---|---|
| 7,720,026 B2 | 5/2010 | Chen et al. | |
| 8,130,731 B2 * | 3/2012 | Hollick et al. | 370/337 |
| 8,150,993 B2 * | 4/2012 | Glasser et al. | 709/231 |
| 8,204,055 B2 * | 6/2012 | Bichot et al. | 370/390 |
| 8,495,232 B2 * | 7/2013 | Wu et al. | 709/230 |
| 8,737,366 B2 * | 5/2014 | Hollick et al. | 370/337 |
| 2003/0012176 A1 * | 1/2003 | Kondylis et al. | 370/348 |
| 2004/0184473 A1 * | 9/2004 | Tavli et al. | 370/445 |
| 2004/0184477 A1 * | 9/2004 | Tavli et al. | 370/461 |
| 2005/0002347 A1 * | 1/2005 | Lee et al. | 370/312 |
| 2008/0175264 A1 * | 7/2008 | Qu et al. | 370/436 |
| 2009/0017850 A1 | 1/2009 | Jovicic et al. | |
| 2009/0019173 A1 * | 1/2009 | Wu et al. | 709/230 |
| 2009/0279563 A1 | 11/2009 | Sampath et al. | |
| 2010/0009687 A1 * | 1/2010 | Koivisto et al. | 455/450 |
| 2010/0115099 A1 | 5/2010 | Gu et al. | |
| 2010/0246470 A1 * | 9/2010 | Jerbi et al. | 370/312 |
| 2010/0322196 A1 | 12/2010 | Cherian et al. | |
| 2011/0013574 A1 * | 1/2011 | Hsu | 370/329 |
| 2011/0109482 A1 * | 5/2011 | Haran | 340/995.1 |
| 2011/0128849 A1 * | 6/2011 | Guo | 370/235 |
| 2011/0128902 A1 * | 6/2011 | Guo | 370/312 |
| 2011/0150108 A1 * | 6/2011 | Chae et al. | 375/259 |
| 2011/0158199 A1 * | 6/2011 | Zhai | 370/329 |
| 2011/0206020 A1 * | 8/2011 | Hollick et al. | 370/337 |
| 2011/0216688 A1 * | 9/2011 | Katori | 370/312 |
| 2013/0208620 A1 * | 8/2013 | Kaufman et al. | 370/254 |

FOREIGN PATENT DOCUMENTS

| | | |
|---|---|---|
| JP | 2005136642 A | 5/2005 |
| JP | 2007233478 A | 9/2007 |
| JP | 2009100391 A | 5/2009 |
| WO | WO 0221769 A2 * | 3/2002 |
| WO | WO 2008000554 A1 * | 1/2008 |
| WO | WO-2009009687 | 1/2009 |
| WO | 2009133444 A1 | 11/2009 |
| WO | WO 2010061483 A1 * | 6/2010 |
| WO | WO-2012051375 A1 | 4/2012 |
| WO | WO-2012063950 A1 | 5/2012 |

OTHER PUBLICATIONS

Ahizoune et al., A Contention-Free Broadcast Protocol for Periodic Safety Messages in Vehicular Ad-Hoc Networks, 2010 IEEE 35th Conference on Local Computer Networks (LCN), pp. 48-55, Oct. 10-14, 2010.*

International Search Report and Written Opinion—PCT/US2012/045465—ISA/EPO—Jan. 25, 2013.

* cited by examiner

COEXISTENCE OF PRIORITY BROADCAST AND UNICAST IN PEER-TO-PEER NETWORKS

CROSS-REFERENCE TO RELATED APPLICATION(S)

This application claims the benefit of U.S. Provisional Application Ser. No. 61/505,464, entitled "COEXISTENCE OF PRIORITY BROADCAST AND UNICAST IN PEER-TO-PEER NETWORKS" and filed on Jul. 7, 2011, which is expressly incorporated by reference herein in its entirety.

BACKGROUND

1. Field

The present disclosure relates generally to communication systems, and more particularly, to the coexistence of priority broadcast and unicast in peer-to-peer networks, such as vehicular peer-to-peer networks.

2. Background

In vehicular networks, wireless devices may periodically transmit safety-related messages through broadcast channels. Periodic and dedicated resources may be allocated for the broadcast messages to ensure that every transmitting wireless device can access channels with guaranteed finite delays while suffering minimal interference from other transmitting wireless devices. With the periodic and dedicated resources, the low-latency, reliable, and real-time requirements of traffic safety applications can be achieved between the transmitting wireless devices and their potential receiving wireless devices. The remaining resources may be allocated to unicast communication to allow wireless devices to engage in one-to-one (peer-to-peer) communications. However, in some extremely time-critical safety applications, packets can be generated on the fly and cannot wait for a next allocated broadcast slot. In this scenario, the fixed allocation of broadcast resources and unicast resources is not adequate. As such, there is a need for a method and an apparatus that allows for the prompt transmission of packets, such as in time-critical safety applications.

SUMMARY

In an aspect of the disclosure, a method, a computer program product, and an apparatus are provided. The apparatus transmits a first broadcast signal including information indicating an intention to use a unicast resource for a broadcast. In addition, the apparatus transmits a second broadcast signal in the unicast resource.

In an aspect of the disclosure, a method, a computer program product, and an apparatus are provided. The apparatus, which is a first wireless device, receives a first broadcast signal from a second wireless device including information indicating an intention to use a unicast resource for a broadcast. In addition, the apparatus receives a first scheduling signal from the second wireless device in a scheduling resource. The first scheduling signal is for indicating a second intention to use the unicast resource for transmitting a second broadcast signal. Furthermore, the apparatus refrains from transmitting a second scheduling signal in the scheduling resource in response to the first scheduling signal.

In an aspect of the disclosure, a method, a computer program product, and an apparatus are provided. The apparatus, which is a first wireless device, receives a first broadcast signal from a second wireless device including information indicating an intention to use a unicast resource for transmitting a second broadcast signal. In addition, the apparatus refrains from transmitting data on the unicast resource concurrently with the second broadcast signal.

DETAILED DESCRIPTION

Figure 1:
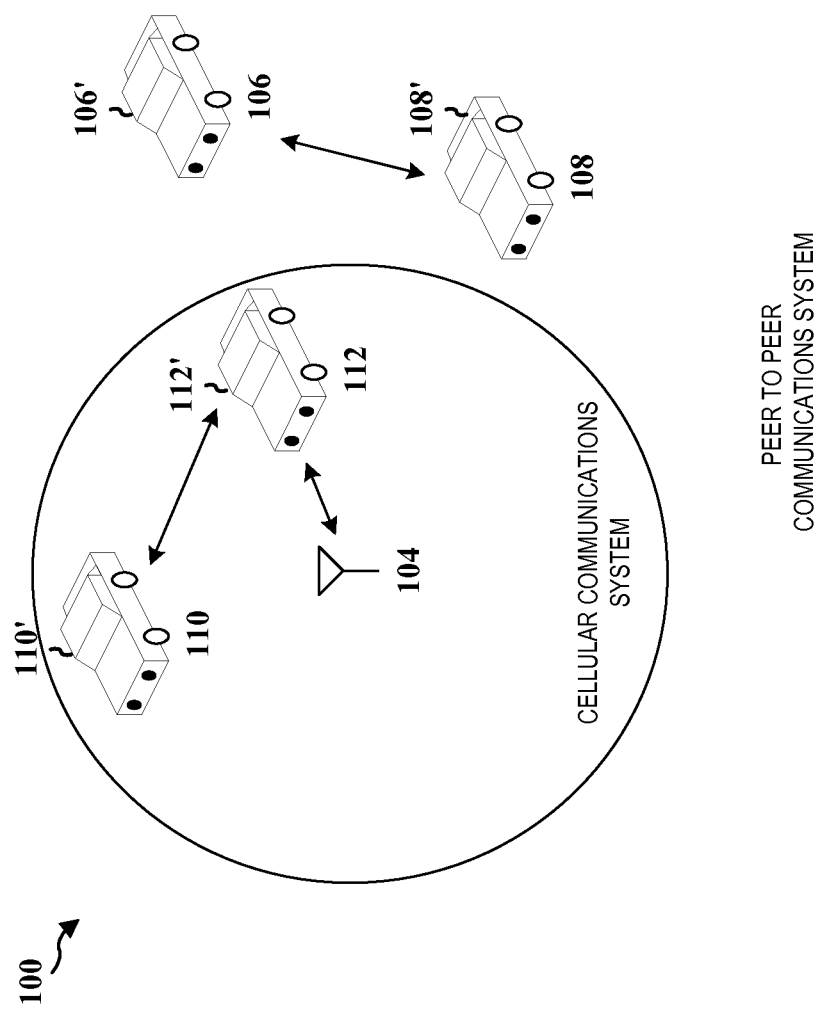
FIG. 1 is a diagram illustrating a wireless peer-to-peer communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a drawing of an exemplary peer-to-peer communications system 100. The peer-to-peer communications system 100 includes vehicles 106', 108', 110', 112' equipped with wireless devices 106, 108, 110, 112, respectively. The peer-to-peer (or vehicle-to-vehicle) communications system 100 may overlap with a cellular communications system, such as for example, a wireless wide area network (WWAN). Some of the wireless devices 106, 108, 110, 112 may communicate together in peer-to-peer communication, some may communicate with the base station 104, and some may do both. For example, as shown in FIG. 1, the wireless devices 106, 108 are in peer-to-peer communication and the wireless devices 110, 112 are in peer-to-peer communication. The wireless device 112 is also communicating with the base station 104.

A wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, VLinQ, WiMedia, Bluetooth, ZigBee, or Wi-Fi based on the IEEE 802.11 standard. To simplify the discussion, the exemplary methods and apparatus may be discussed within the context of VLinQ. However, one of ordinary skill in the art would understand that the exemplary methods and apparatuses are applicable more generally to a variety of other wireless peer-to-peer communication systems.

Figure 2:
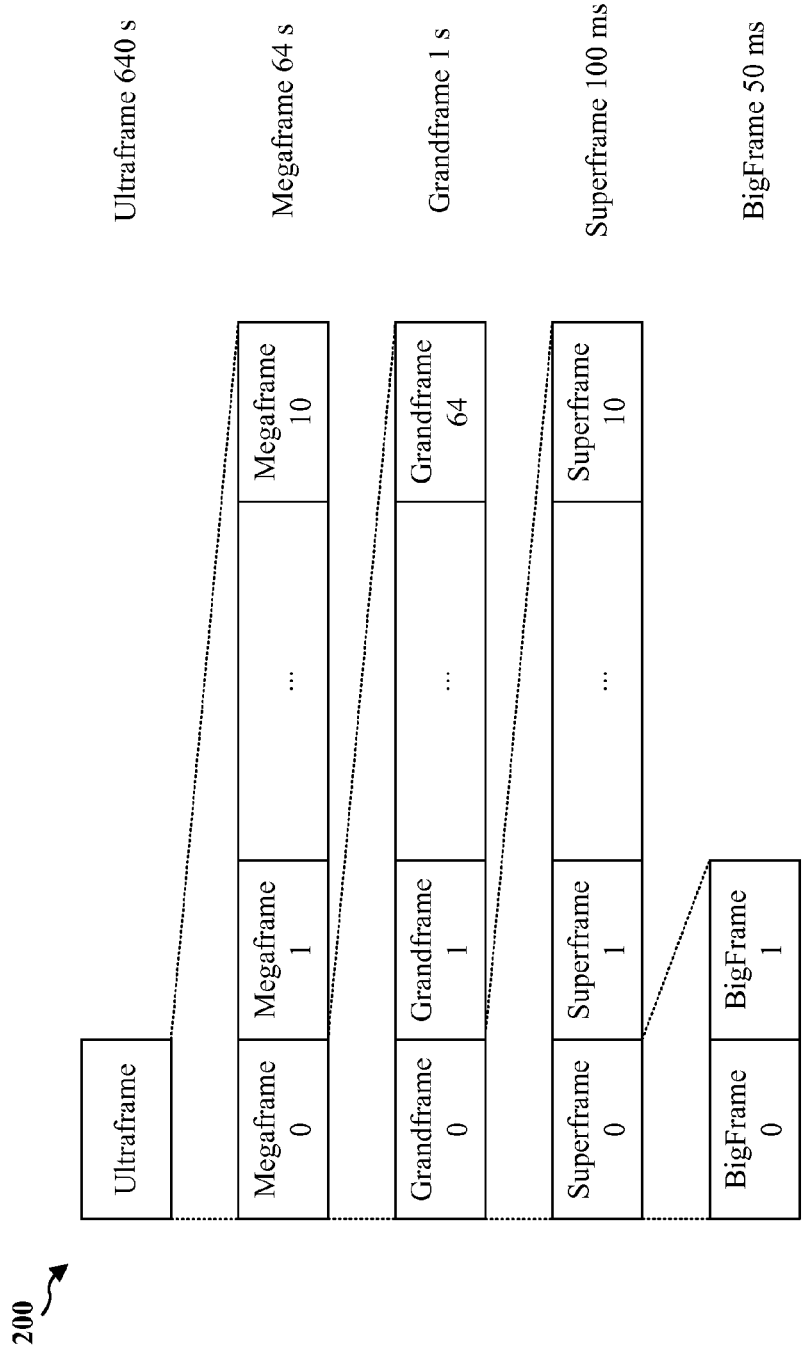
FIG. 2 is a diagram illustrating an exemplary time structure for peer-to-peer communication between the wireless devices.

FIG. 2 is a diagram 200 illustrating an exemplary time structure for peer-to-peer communication between the wireless devices. An ultraframe is 640 seconds and includes ten megaframes. Each megaframe is 64 seconds and includes 64 grandframes. Each grandframe is one second and includes ten superframes. Each superframe is 100 ms and includes two bigframes. Each bigframe is 50 ms. A bigframe may also be referred to as a frame.

Figure 3:
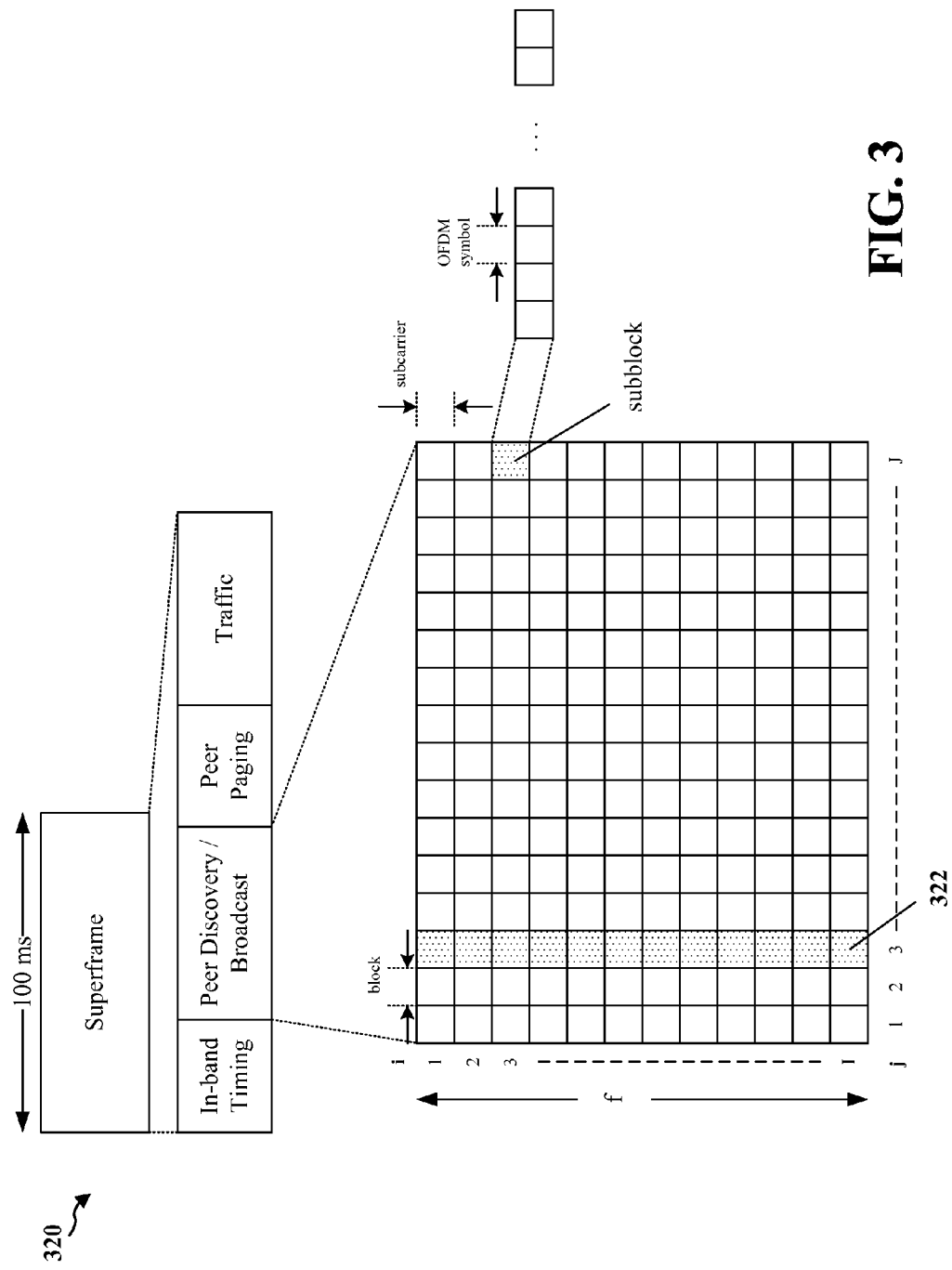
FIG. 3 is a diagram illustrating an operation timeline of a superframe and a structure of a peer discovery/broadcast channel.

FIG. 3 is a diagram 320 illustrating an operation timeline of a superframe and an exemplary structure of a peer discovery/broadcast channel. The superframe includes an in-band timing channel, a peer discovery/broadcast channel, a peer paging channel, and a data traffic channel (TCCH). The peer discovery/broadcast channel may include J blocks (e.g., 75) for communicating peer discovery/broadcast information. Each block may include I subblocks (e.g., 112). Each subblock may include a plurality of orthogonal frequency-division multiplexing (OFDM) symbols (e.g., 22) at the same subcarrier. Different blocks may correspond to different peer discovery resource identifiers (PDRIDs). For example, a first PDRID may correspond to the block at j=1, a second PDRID may correspond to the block at j=2, etc.

Upon power up, a wireless device listens to the peer discovery/broadcast channel for a period of time and selects a PDRID based on a determined energy on each of the PDRIDs. For example, a wireless device may select a PDRID corresponding to the block 322 at j=3. The particular PDRID may map to other blocks in other superframes due to hopping. In the block associated with the selected PDRID, the wireless device transmits its peer discovery/broadcast signal. In blocks unassociated with the selected PDRID, the wireless device listens for peer discovery/broadcast signals transmitted by other wireless devices.

The wireless device may also reselect a PDRID if the wireless device detects a PDRID collision. That is, a wireless device may listen rather than transmit on its available peer discovery/broadcast resource (herein referred to as "broadcast resource) in order to detect an energy on the broadcast resource corresponding to its PDRID. The wireless device may also detect energies on other broadcast resources corresponding to other PDRIDs. The wireless device may reselect a PDRID based on the determined energy on the broadcast resource corresponding to its PDRID and the detected energies on the other broadcast resources corresponding to other PDRIDs.

Figure 4:
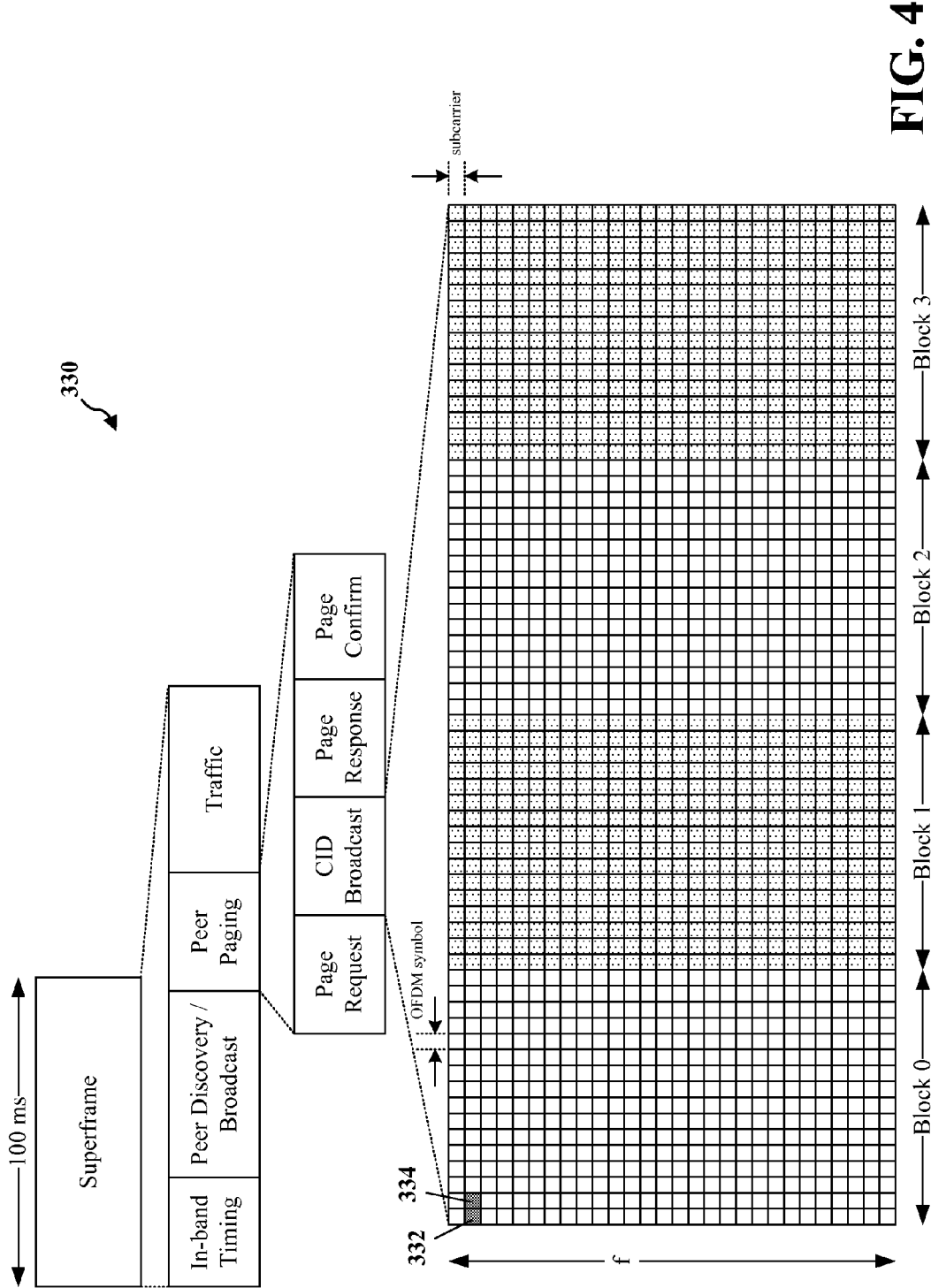
FIG. 4 is a diagram illustrating a structure of a connection identifier broadcast.

FIG. 4 is a diagram 330 illustrating a structure of a connection identifier (CID) broadcast. The peer paging channel includes a page request channel, a CID broadcast channel, a page response channel, and a page confirm channel. The CID broadcast channel provides a distributed protocol for CID allocations for new connections, provides a mechanism for CID collision detection, and provides a wireless device evidence that its link connection with a communication peer still exists. The CID defines a link between two wireless devices in peer-to-peer communication and defines data traffic resources that can be utilized for the peer-to-peer communication.

The structure of the CID broadcast may include four blocks, each of which contains a plurality of resource elements, i.e., a plurality of subcarriers in the frequency domain and OFDM symbols in the time domain. Each of the four blocks may span a plurality of subcarriers (e.g., 28 subcarriers) and include 16 OFDM symbols. One resource element (or tone) corresponds to one subcarrier and one OFDM symbol.

For each CID, a pair of resource elements in adjacent OFDM symbols is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each superframe. In any given link, the wireless device that initiated the link randomly selects a block from Block 0 and Block 2 for the CID broadcast and the other wireless device in the link randomly selects a block from Block 1 and Block 3 for the CID broadcast. As such, for a particular CID, only half of the allocated resources are utilized by a link with that CID. Due to the random selection of a block, a first wireless device in a link with a second wireless device will be able to detect a CID collision when a third wireless device or a fourth wireless device in a different link transmits a CID broadcast using a block different than the block selected by the first wireless device or the second wireless device.

Figure 5:
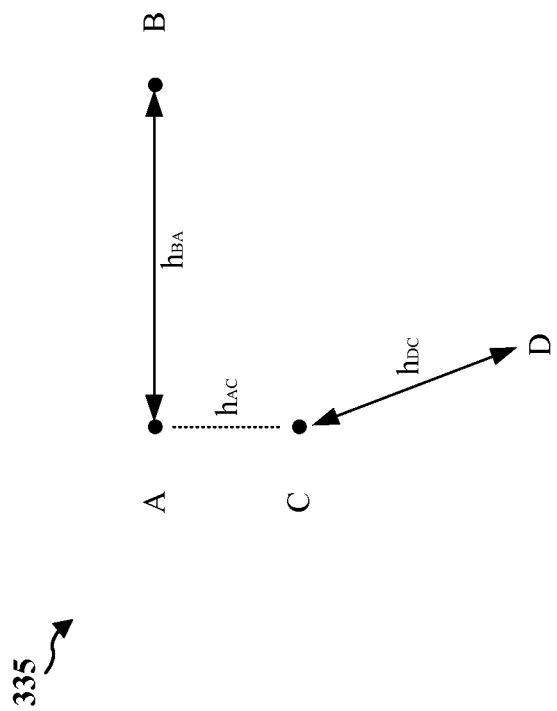
FIG. 5 is a diagram for illustrating the selection of a new connection identifier.

FIG. 5 is a diagram 335 for illustrating the selection of a new CID. Assume a node A and a node B are in a link and the node A with a CID=4 selects Block 0 for the CID broadcast. The node A may be allocated resource elements 332, 334 for the CID broadcast. In resource element 332, the node A transmits at a power $P_A$. In resource element 334, the node A transmits at a power $K/P_B|h_{BA}|^2$, where $P_B$ is a power at which node B transmits, $|h_{BA}|^2$ is the path loss between the node B and the node A, and K is a constant known to all the nodes. In a subsequent superframe, the node A may have a different pair of resource elements with a different subcarrier, but the same relative OFDM symbol position (i.e., in this example, the first and the second OFDM symbol of the selected block). Assume a node C and a node D are in a link and the node C receives the CID broadcast from the node A and the node B. The node C receives the transmission in the resource element 332 at a power equal to $P_A|h_{AC}|^2$, where $|h_{AC}|^2$ is the path loss between the node A and the node C, and the transmission in the resource element 334 at a power equal to $K|h_{AC}|^2/P_B|h_{BA}|^2$. The node C receives the CID broadcast from the node B at powers equal to $P_B|h_{BC}|^2$ and $K|h_{BC}|^2/P_A|h_{AB}|^2$, where $|h_{BC}|^2$ is the path loss between the node B and the node C, and $|h_{AB}|^2$ is the path loss between the node A and the node B. The node C receives the CID broadcast from the node D at powers of $P_D|h_{DC}|^2$ and $K/P_C$ (i.e., $K|h_{DC}|^2/P_C|h_{CD}|^2$), where $P_D$ is the power at which the node D transmits, $|h_{DC}|^2$ is the path loss between the node D and the node C, $P_C$ is the power at which the node C transmits, and $|h_{CD}|^2$ is the path loss between the node C and the node D (the channel $h_{CD}$ and the channel $h_{DC}$ are assumed to be equal). If there is a CID collision such that the CID of the nodes C, D is the same as the CID of the nodes A, B, the node C would select a new CID unless the node C expects a reasonable signal to interference ratio (SIR) if scheduled and the node C would not cause too much interference to the node A or the node B. That is, the node C selects a new CID if the $$\min\left(\frac{P_D|h_{DC}|^2}{P_A|h_{AC}|^2}, \frac{P_D|h_{DC}|^2}{P_B|h_{BC}|^2}\right) \leq \gamma_R$$

or the $$\min\left(\frac{P_B|h_{BA}|^2}{P_C|h_{AC}|^2}, \frac{P_A|h_{AB}|^2}{P_C|h_{BC}|^2}\right) \leq \gamma_T,$$

where $\gamma_R$ and $\gamma_T$ are thresholds.

Figure 6:
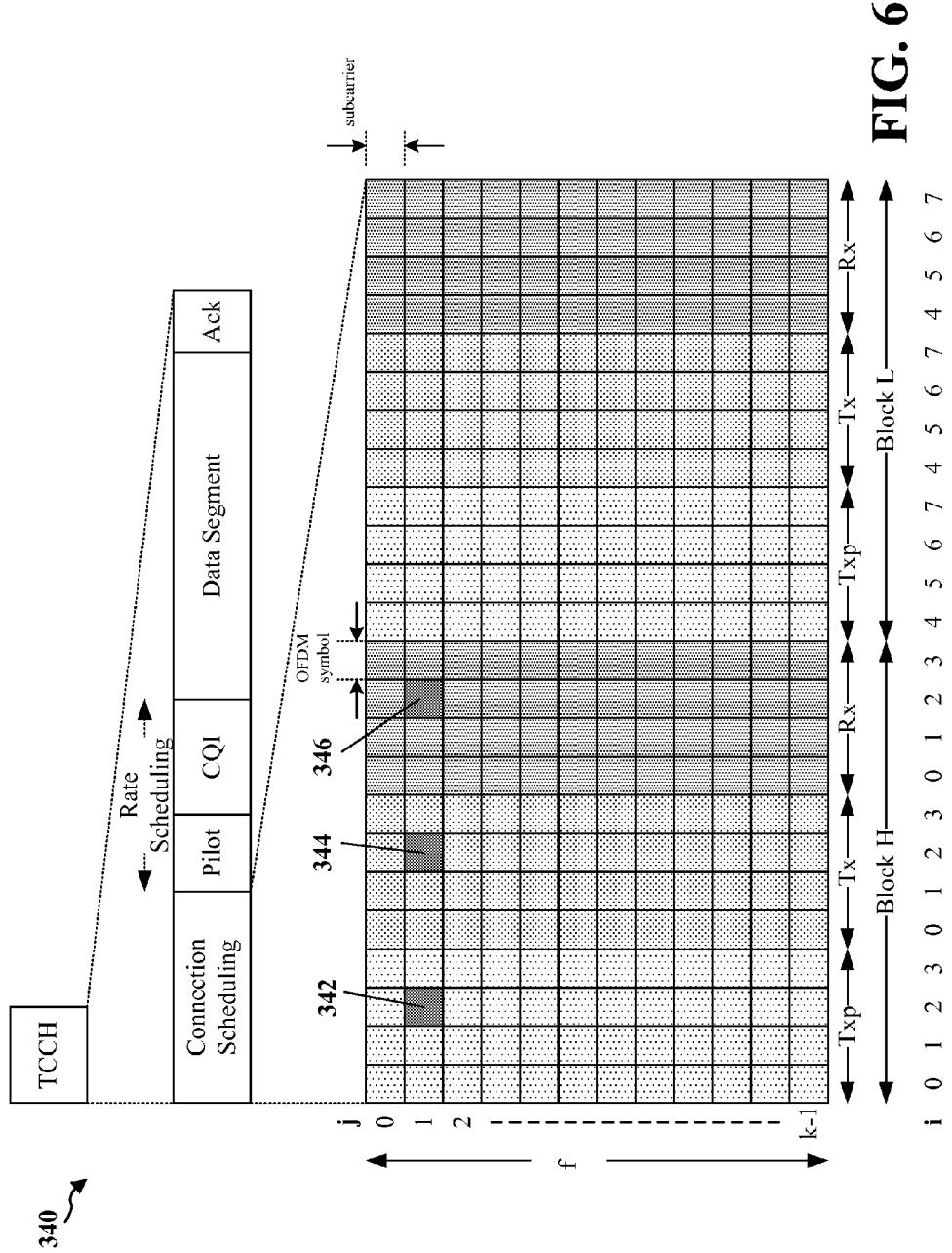
FIG. 6 is a diagram illustrating an operation timeline of a traffic channel slot and a structure of connection scheduling.

FIG. 6 is a diagram 340 illustrating an operation timeline of a TCCH slot and a structure of connection scheduling. As shown in FIG. 6, a TCCH slot includes four subchannels: connection scheduling, rate scheduling, data segment, and ACK. The rate scheduling subchannel includes a pilot segment and a CQI segment. The ACK subchannel is for transmitting an ACK or negative ACK (NACK) in response to data received in the data segment subchannel. The connection scheduling subchannel includes two blocks, a higher priority Block H and a lower priority Block L. Each of Block H and Block L contains a plurality of resource elements, i.e., a plurality of subcarriers in the frequency domain and OFDM symbols in the time domain. Each of Block H and Block L spans the plurality of subcarriers and includes four OFDM symbols in a Txp-block, four OFDM symbols in a Tx-block, and four OFDM symbols in an Rx-block. One resource element (or tone) corresponds to one subcarrier and one OFDM symbol.

Each link has a CID. Based on the CID, for a particular TCCH slot, wireless devices in a link are allocated a resource element in the same respective OFDM symbol position in each of the Txp-block, the Tx-block, and the Rx-block at a particular subcarrier and within Block H or Block L. For example, in a particular TCCH slot, a link with CID=4 may be allocated the resource element 342 in the Txp-block of Block H, the resource element 344 in the Tx-block of Block H, and the resource element 346 in the Rx-block of Block H for transmitting/receiving a scheduling control signal. A transmit request signal in the Tx-block is transmitted with a power equal to a power for transmitting the data segment. A transmit request response signal in the Rx-block is transmitted with a power proportional to an inverse of the power of the received transmit request signal. The allocated trio of resource elements for the Txp-block, Tx-block, and Rx-block vary with respect to the subcarrier (e.g., k different subcarriers) and the respective OFDM symbol in each TCCH slot (e.g., 8 different OFDM symbols—4 in the Block H and 4 in the Block L).

The trio of resource elements allocated to a link dictates the medium access priority of the link. For example, the trio of resource elements 342, 344, 346 corresponds to i=2 and j=1. The medium access priority is equal to ki+j+1, where i is the respective OFDM symbol in each of the Txp, Tx, and Rx subblocks, j is the subcarrier, and k is the number of subcarriers. Accordingly, assuming k=28, the resource elements 342, 344, 346 correspond to a medium access priority of 58.

Figure 7:
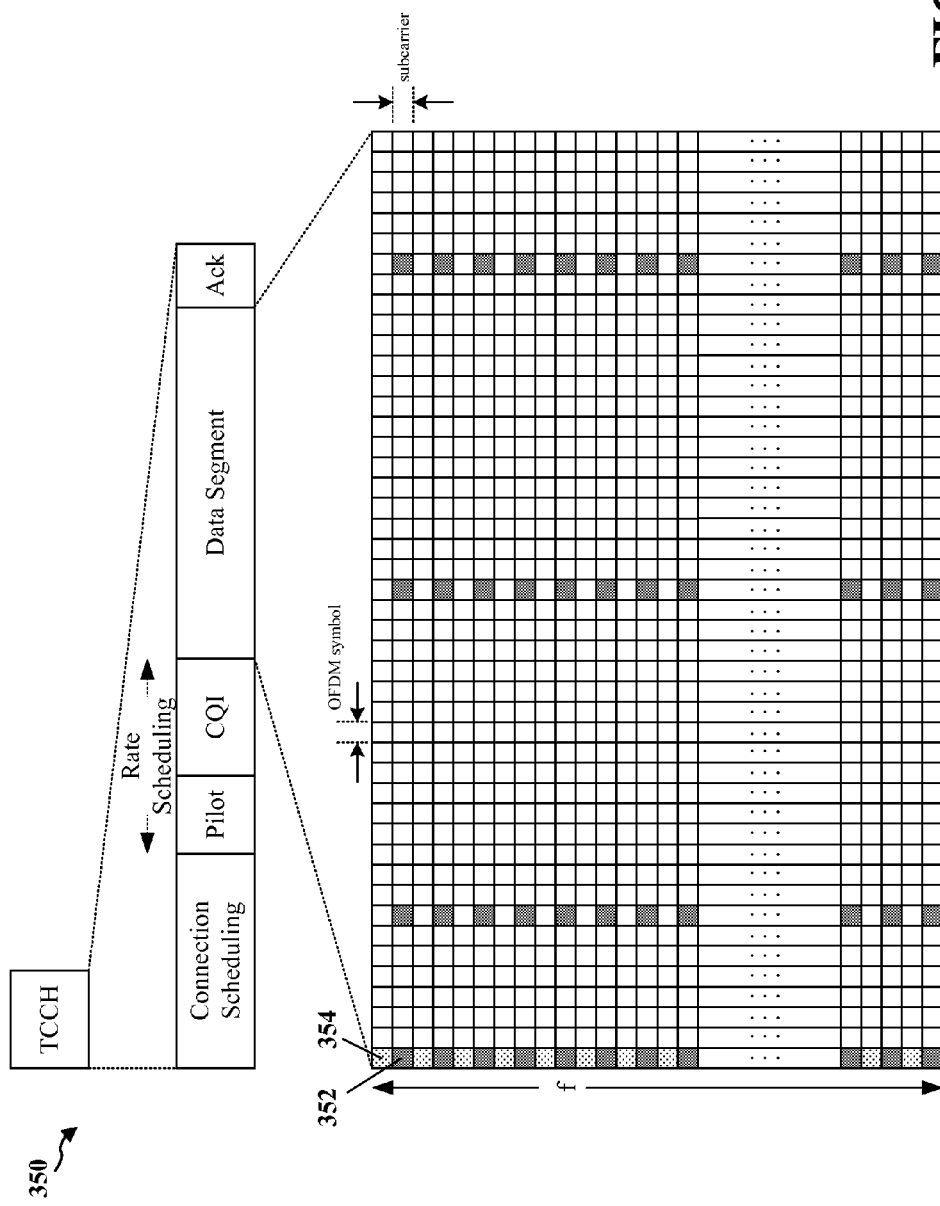
FIG. 7 is a diagram illustrating a structure of a data segment.

FIG. 7 is a diagram 350 illustrating a structure of the data segment. The data segment contains a plurality of resource elements spanning a plurality of subcarriers in the frequency domain and OFDM symbols in the time domain. Some of the resource elements in the data segment, such as resource element 354, may carry rate indicator information regarding the coding and/or modulation used for the data segment. Other resource elements in the data segment, such as resource element 352, may carry a pilot to allow for estimating the channel for demodulation and decoding.

Figure 8B:
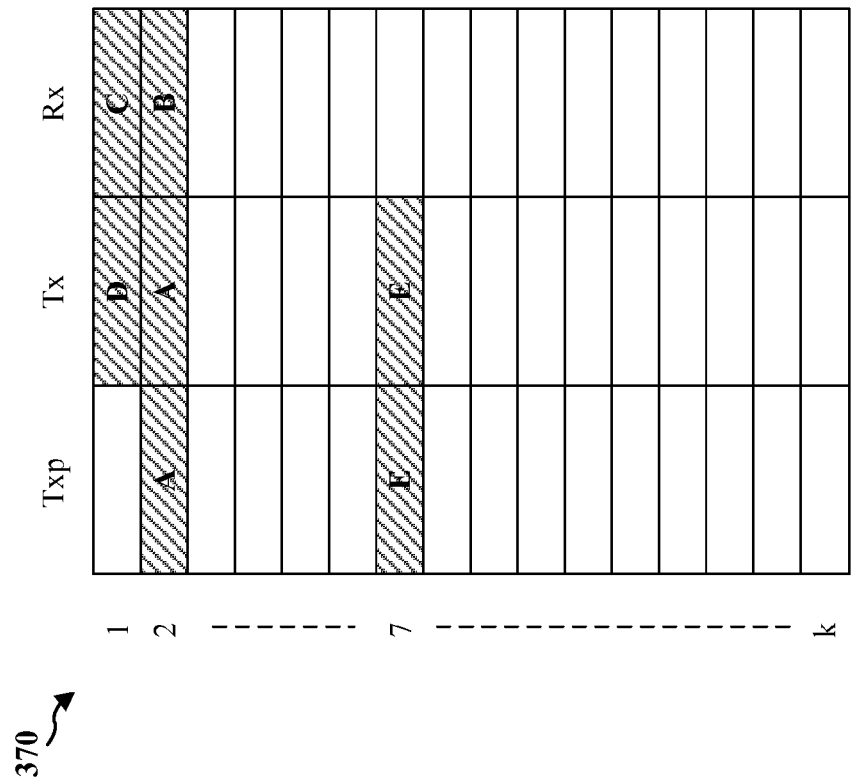
FIG. 8B is a second diagram for illustrating a connection scheduling signaling scheme for the wireless devices.
Figure 8A:
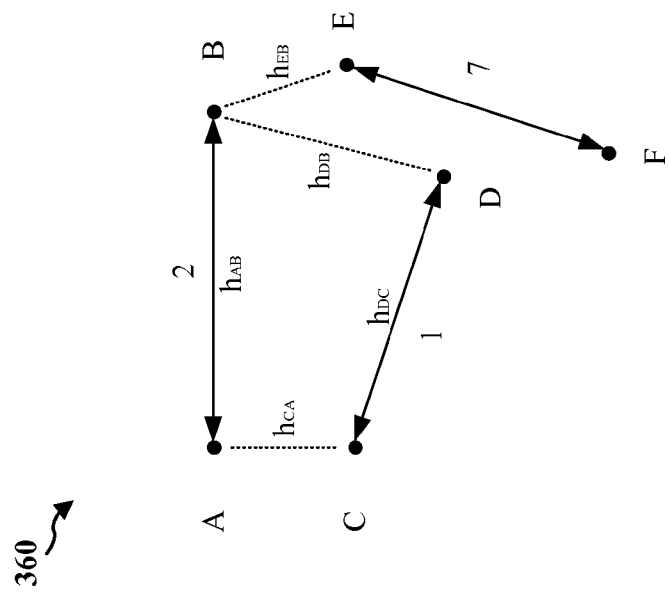
FIG. 8A is a first diagram for illustrating a connection scheduling signaling scheme for the wireless devices.

FIG. 8A is a first diagram 360 for illustrating an exemplary connection scheduling signaling scheme for the wireless devices 100. As shown in FIG. 8A, wireless device A is communicating with wireless device B, wireless device C is communicating with wireless device D, and wireless device E is communicating with wireless device F. The wireless device A is assumed to have transmit priority over the wireless device B, the wireless device C is assumed to have transmit priority over the wireless device D, and the wireless device E is assumed to have transmit priority over the wireless device F. Each of the links has a different medium access priority depending on the particular slot for communication. For the particular slot for communication, link 1 (A, B) is assumed to have a medium access priority of 2, link 2 (C, D) is assumed to have a medium access priority of 1, and link 3 (E, F) is assumed to have a medium access priority of 7.

FIG. 8B is a second diagram 370 for illustrating an exemplary connection scheduling signaling scheme for the wireless devices. FIG. 8B shows connection scheduling resources of first respective OFDM symbols (i=0, see FIG. 6) of Txp, Tx, and Rx subblocks in Block H (corresponding to medium access priorities 1 through k) in the connection scheduling subchannel. The connection scheduling resources include a plurality of subcarriers, each of the subcarriers corresponding to one of k frequency bands. Each of the frequency bands corresponds to a particular medium access priority. One block in the connection scheduling resources is split into three subblocks/phases: Txp, Tx, and Rx. The Txp-block is used by the node with transmit priority in the link to indicate whether the node with transmit priority will act as a transmitter or a receiver. If the node with transmit priority transmits on the allocated OFDM symbol in the Txp-block, the node with transmit priority indicates to the node without transmit priority an intent to act as a transmitter. If the node with transmit priority does not transmit on the allocated OFDM symbol in the Txp-block, the node with transmit priority indicates to the node without transmit priority an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., a power for transmitting the data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison.

For example, assume the nodes A, D, and E transmit a transmit request signal in the Tx-block at a power equal to $P_A$, $P_D$, and $P_E$, respectively. The node B receives the transmit request signal from the node A at a power equal to $P_A|h_{AB}|^2$, where $|h_{AB}|^2$ is the path loss between the node A and the node B. The node B receives the transmit request signal from the node D with a power equal to $P_D|h_{DB}|^2$, where $|h_{DB}|^2$ is the path loss between the node D and the node B. The node B receives the transmit request signal from the node E with a power equal to $P_E|h_{EB}|^2$, where $|h_{EB}|^2$ is the path loss between the node E and the node B. The node B compares the power of the received transmit request signal from the node A divided by the sum of the powers of the received transmit request signals from other nodes with a higher priority to a threshold in order to determine whether to Rx-yield. The node B does not Rx-yield if the node B expects a reasonable SIR if scheduled. That is, the node B Rx-yields unless $P_A|h_{AB}|^2/P_D|h_{DB}|^2 > \gamma_{RX}$, where $\gamma_{RX}$ is the threshold (e.g., 9 dB).

The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link. All of the transmitters listen to the tones in the Rx-block to determine whether to Tx-yield transmission of the data segment.

For example, the node C, having received the transmit request signal from the node D at a power equal to $P_D|h_{DC}|^2$, transmits a transmit request response signal in the Rx-block at a power equal to $K/P_D|h_{DC}|^2$, where $|h_{DC}|^2$ is the path loss between the node D and the node C, and K is a constant known to all nodes. The node A receives the transmit request response signal from the node C at a power equal to $K|h_{CA}|^2/P_D|h_{DC}|^2$, where $|h_{CA}|^2$ is the path loss between the node C and the node A. The node A Tx-yields if the node A would cause too much interference to the node C. That is, the node A Tx-yields unless $P_D|h_{DC}|^2/P_A|h_{CA}|^2 > \gamma_{TX}$, where $\gamma_{TX}$ is a threshold (e.g., 9 dB).

The connection scheduling signaling scheme is best described in conjunction with an example. The node C has no data to transmit and does not transmit in the Txp-block for medium access priority 1, the node A has data to transmit and transmits in the Txp-block for medium access priority 2, and the node E has data to transmit and transmits in the Txp-block for medium access priority 7. The node D has data to transmit and transmits in the Tx-block for medium access priority 1, the node A transmits in the Tx-block for medium access priority 2, and the node E transmits in the Tx-block for medium access priority 7. The node C listens to the tones in the Tx-blocks and determines to transmit in the Rx-block for medium access priority 1, as the node C has the highest priority. The node B listens to the tones in the Tx-blocks, determines that its link would not receive too much interference from link 2, which has a higher medium access priority, and transmits in the Rx-block for medium access priority 2. The node F listens to the tones in the Tx-blocks, determines that its link would not receive too much interference from the link 1 and/or link 2, both of which have a higher medium access priority, and Rx-yields by not transmitting in the Rx-block for medium access priority 7. Subsequently, both the node D and the node A listen to the tones in the Rx blocks to determine whether to transmit the data. Because the node D has a higher link medium access priority than the node A, the node D transmits its data. The node A will Tx-yield transmission of the data if the node A determines that its transmission would interfere with the transmission from the node D.

Figure 9:
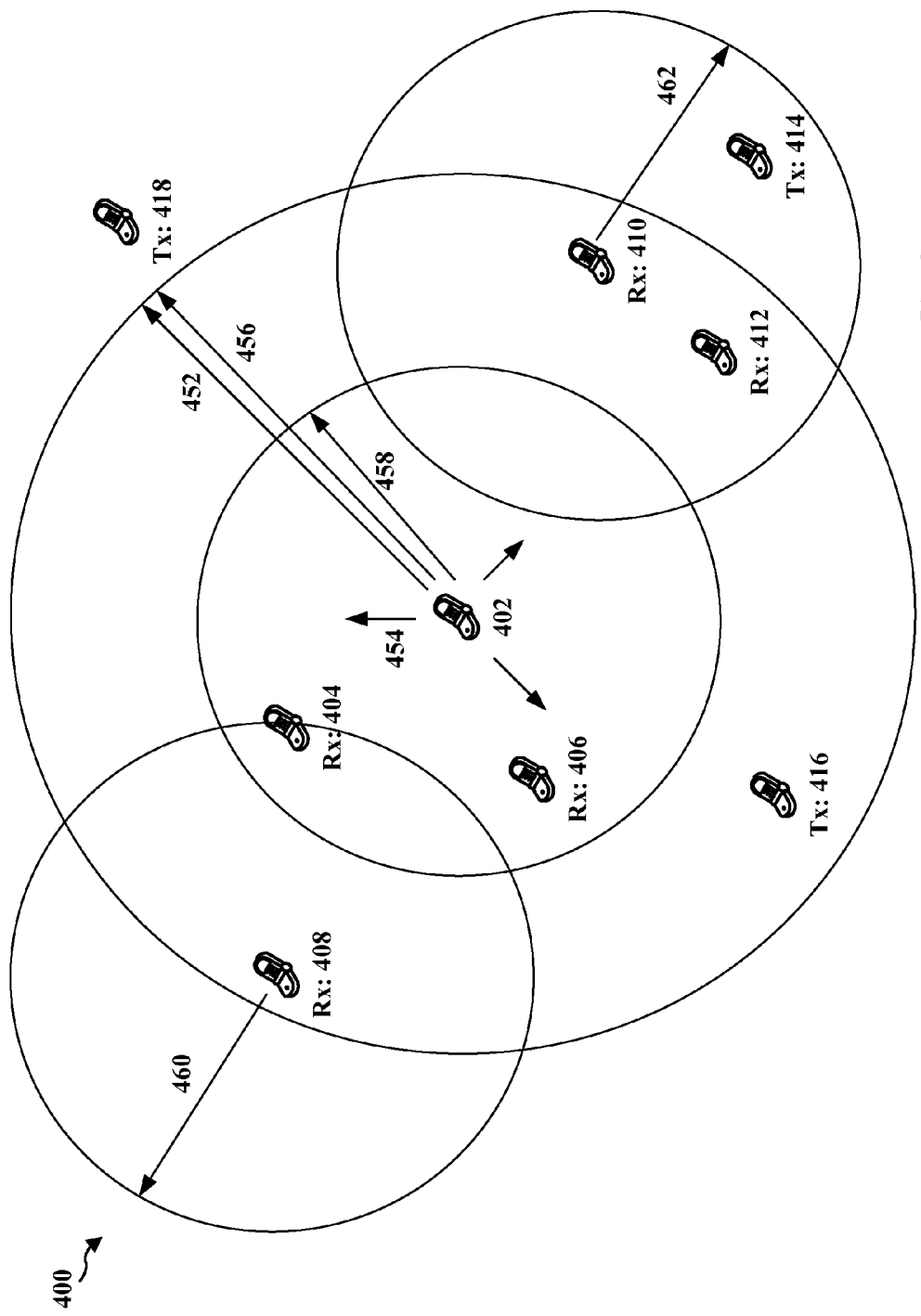
FIG. 9 is a diagram for illustrating an exemplary method.

FIG. 9 is a diagram 400 for illustrating an exemplary method. In each superframe, the wireless device 402 is allocated peer discovery/broadcast resources for sending broadcast messages (see FIG. 3). In addition, based on its CID (see FIG. 4 and FIG. 5), the wireless device 402 may contend for the unicast resources (i.e., data segment of FIG. 7) for sending data in peer-to-peer communication with another wireless device. The contention occurs through connection scheduling, as described in relation to FIGS. 6, 8A, 8B. According to an exemplary method, the wireless device 402 utilizes a unicast resource for sending broadcast messages. The wireless device 402 may determine to utilize the unicast resource for transmitting a broadcast message due to a need to transmit additional broadcast information with low latency. The additional information may be too much to transmit rapidly in the allocated broadcast resources or may be too urgent to wait until the next allocated broadcast resource. The wireless device 402 transmits a first broadcast signal 452 including information indicating an intention to use a unicast resource for a broadcast. The information indicating an intention to use the unicast resource may be information indicating the actual unicast resource that will be used for the broadcast. The first broadcast signal 452 is transmitted in an allocated broadcast resource within the peer discovery/broadcast channel. Subsequently, the wireless device transmits the additional information in a second broadcast signal 454 in the unicast resource.

In addition to transmitting an intention to use a unicast resource for a broadcast, the wireless device 402 may communicate a second intention to use the unicast resource through the transmission of a scheduling signal 456 in a scheduling resource during connection scheduling. The scheduling resource may be the highest priority resource. For example, the wireless device 402 may transmit in the highest priority resource in the Tx phase (e.g., Blocks L or H at i,j=0,0 of FIG. 6). The transmission of the first broadcast signal 452 and the scheduling signal 456 each independently allows other wireless devices to ascertain whether a concurrent transmission would receive too much interference from the transmission by the wireless device 402. The wireless device 402 may also communicate an intention to communicate the second intention to use the unicast resource. For example, the wireless device 402 may transmit in the Txp phase.

Because the wireless devices 404, 406, 408, 410, 412 are within range of the scheduling signal 456, they may respond with a scheduling signal (also referred to as an echo scheduling signal) so that other wireless devices may ascertain whether their transmission would cause interference to the wireless devices that responded with the echo scheduling signal, or otherwise, so that other wireless devices may ascertain whether their transmission would cause interference to the wireless devices that receive the second broadcast signal 454 from the wireless device 402. For example, when the wireless devices 404, 406, 408, 410, 412 receive a signal in the Tx phase, they may respond in the Rx phase. However, when multiple wireless devices respond concurrently in the Rx phase, the response signals may interfere with each other. Accordingly, in one configuration, the wireless devices that are relatively close to the wireless device 402 may refrain from transmitting in the Rx phase with a certain probability. For example, the wireless devices 404, 406, which are relatively close to the wireless device 402, may each determine to refrain from transmitting in the Rx phase. The wireless device 402 may transmit the scheduling signal 458 in the Rx phase for the wireless devices 404, 406 that are relative close to the wireless device 402. The wireless device 402 may determine to transmit in the Rx phase for other wireless devices when a density of wireless devices within a particular distance is greater than a density threshold. The wireless device 402 may determine the distance of the wireless devices 404, 406 through location information (e.g., Global Position System (GPS) information) within broadcast signals received from the wireless devices 404, 406, respectively.

As discussed supra, the wireless devices 404-412 receive the broadcast signal 452 from the wireless device 402. The broadcast signal 452 includes information indicating an intention to use a unicast resource for a broadcast. In addition, the wireless devices 404-412 receive the scheduling signal 456 (e.g., Tx signal) from the wireless device 402. The scheduling signal 456 indicates a second intention to use the unicast resource for transmitting the broadcast signal 454. The wireless devices 404, 406 refrain from transmitting a response in the Rx phase because they are relatively close to the wireless device 402. However, because the wireless devices 408, 410, 412 are farther from the wireless device 402, they may determine to transmit in the Rx phase with a higher probability. However, if any of the wireless devices 408, 410, 412 determine that there is a high concentration of wireless devices nearby, the wireless device may reduce its probability of transmitting in the Rx phase. For example, as shown in FIG. 9, the wireless device 408 transmits a scheduling signal 460 in the Rx phase in response to the scheduling signal 456. The wireless device 410 determines that the wireless device 412 is nearby and the wireless device 412 determines that the wireless device 410 is nearby. Accordingly, both lower their probability of transmitting in the Rx phase. Based on the lowered probability, the wireless device 410 transmits a scheduling signal 462 in the Rx phase in response to the scheduling signal 456 and the wireless device 412 refrains from transmitting in the Rx phase.

The wireless device 414, which is outside the range of receiving the broadcast signal 452 or the scheduling signal 456, but inside the range of receiving the scheduling signal 462, determines to yield its data transmission (e.g., Tx yield) based on the received scheduling signal 462 if its CID priority is not the highest priority (because the Rx transmission 462 is transmitted in the highest priority peer discovery/broadcast resource). The wireless device 416, which is inside the range of receiving the broadcast signal 452 and the scheduling signal 456, determines to refrain from its data transmission based on the received broadcast signal 452 and/or the scheduling signal 456 if its data transmission would be concurrent with the transmission of the second broadcast signal 454. The wireless device 418, which is outside the range of receiving the broadcast signal 452 or the scheduling signal 456 and is outside the range of receiving an echo scheduling signal, may use the unicast resource concurrently with the wireless device 402. Accordingly, the wireless device 418 may transmit data to another peer or transmit a broadcast message concurrently with the transmission of the second broadcast signal 454.

Figure 10:
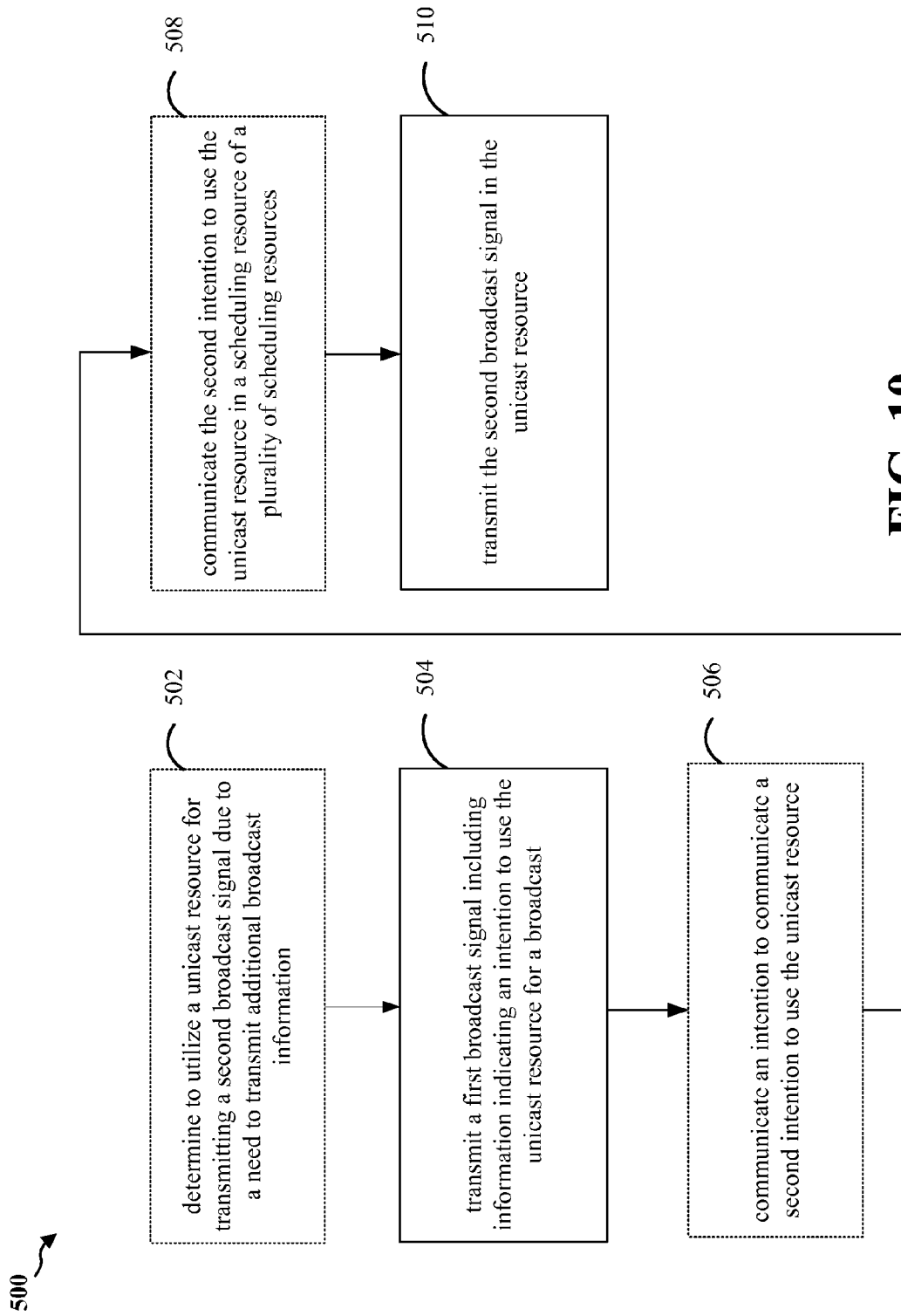
FIG. 10 is a flow chart of a first method of wireless communication.

FIG. 10 is a flow chart 500 of a first method of wireless communication. The method may be performed by a wireless device, such as for example, the wireless device 402. As shown in FIG. 10, in step 502, the wireless device may determine to utilize a unicast resource for transmitting a second broadcast signal due to a need to transmit additional broadcast information with low latency. Through the unicast resource, the wireless device may transmit the additional broadcast information earlier than the next dedicated peer discovery/broadcast resource (which may be available in the next superframe in 100 ms). In step 504, the wireless device transmits a first broadcast signal including information indicating an intention to use a unicast resource for a broadcast. The first broadcast signal may further include a broadcast message. The information indicating the intention to use the unicast resource for the broadcast may include information indicating the unicast resource that will be used for the broadcast. In one configuration, the wireless device may indicate a plurality of unicast resources that the wireless device intends to use for a broadcast. In such a configuration, the wireless device may provide information indicating which TCCHs within one or more superframes and/or which superframes the wireless device intends to use for a broadcast. In step 506, the wireless device may communicate an intention to communicate a second intention to use the unicast resource. The wireless device may communicate the intention to communicate the second intention to use the unicast resource by transmitting a first scheduling signal (e.g., in the Txp phase)

indicating an intention to transmit a second scheduling signal (e.g., in the Tx phase). In step 508, the wireless device may communicate the second intention to use the unicast resource in a scheduling resource of a plurality of scheduling resources (e.g., in the Tx phase). In step 510, the wireless device may transmit a second broadcast signal in the unicast resource.

The plurality of scheduling resources (see FIG. 6) may each have a different associated priority and the scheduling resource in which the second intention is transmitted may have a highest priority (e.g., Blocks L or H at i,j=0,0 of FIG. 6). The wireless device may communicate the second intention to use the unicast resource by transmitting a scheduling signal (e.g., in the Tx phase) with a power equal to an intended power of the transmission of the second broadcast signal.

Figure 11:
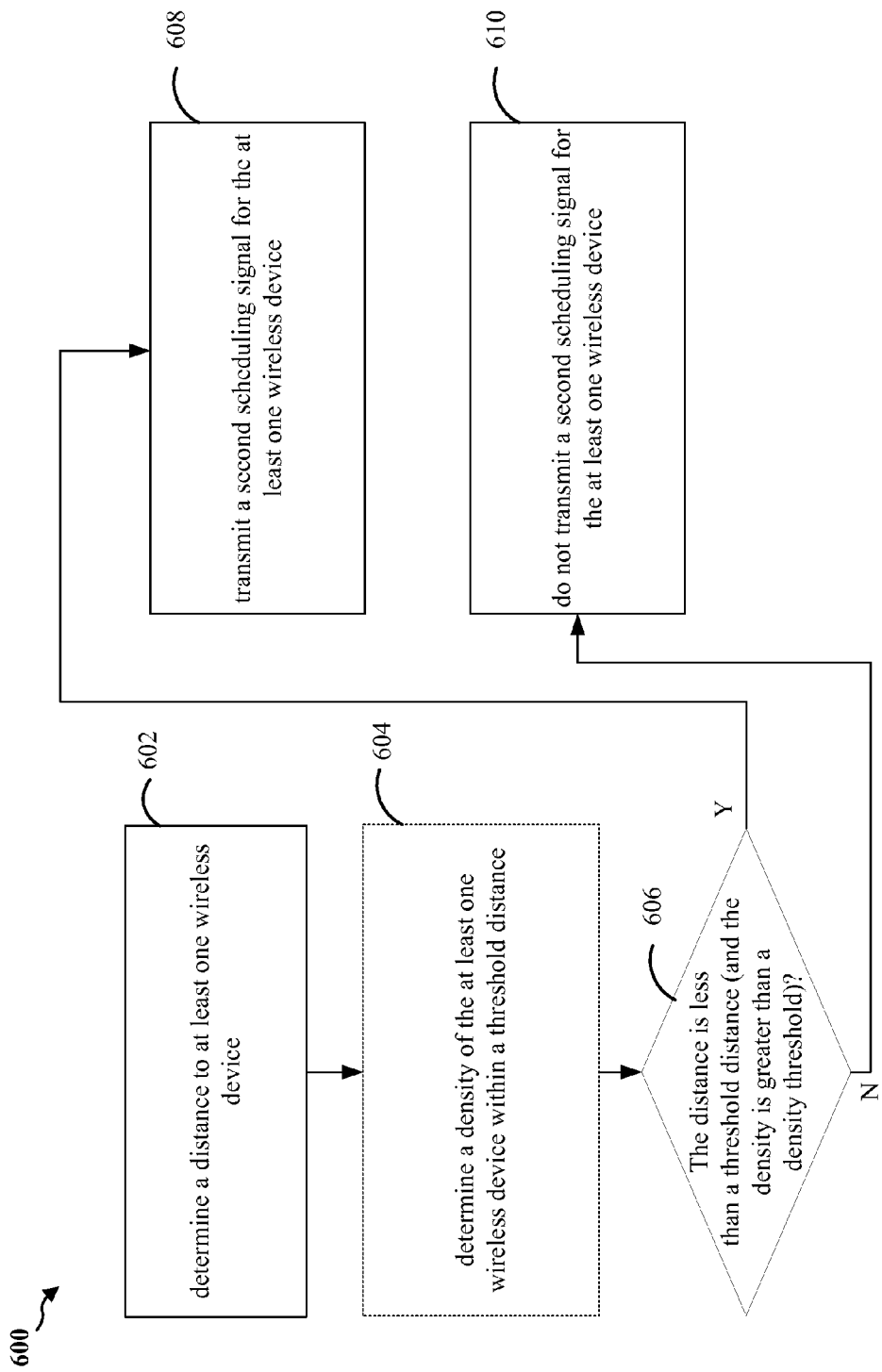
FIG. 11 is a flow chart of a second method of wireless communication.

FIG. 11 is a flow chart 600 of a second method of wireless communication. The method may be performed by a wireless device, such as for example, the wireless device 402. As shown in FIG. 11, in step 602, the wireless device may determine a distance to at least one wireless device. In step 604, the wireless device may also determine a density of wireless devices in the vicinity of each of the at least one wireless device within a threshold distance. In step 606, the wireless device may determine whether the distance is less than a threshold distance for any of the at least one wireless device. If the wireless device performs step 604, in step 606, the wireless device may also determine whether the density of wireless devices within a vicinity of each of the at least one wireless device is greater than a density threshold. If the distance is less than a threshold distance (and the density is greater than a density threshold) for any of the at least one wireless device, in step 608, the wireless device transmits a second scheduling signal (e.g., in the Rx phase) for the at least one wireless device. If the distance is greater than a threshold distance (or the density is less than a density threshold) for all of the at least one wireless device, in step 610, the wireless device does not transmit a second scheduling signal (e.g., in the Rx phase) for the at least one wireless device.

Figure 12:
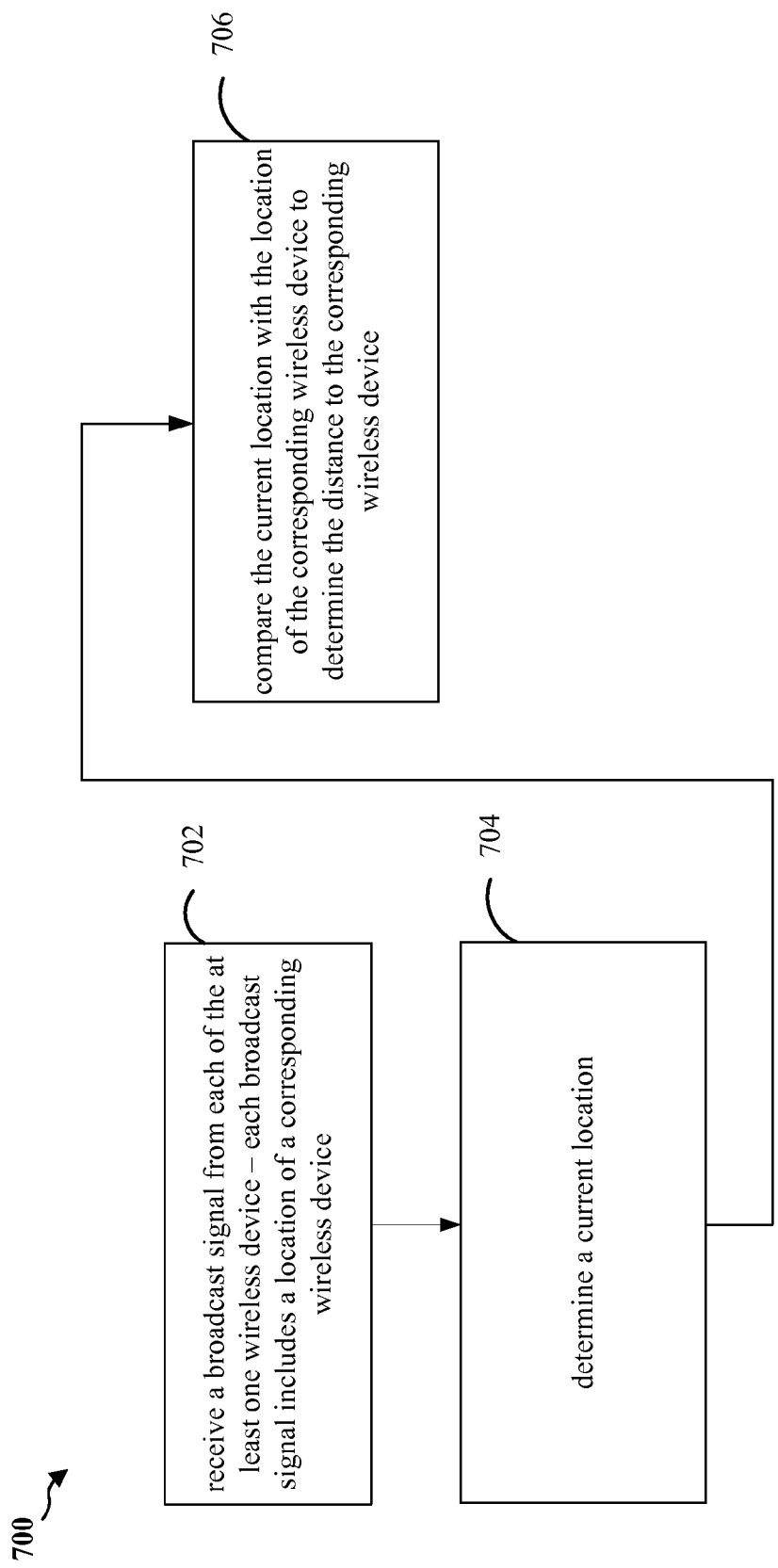
FIG. 12 is a flow chart of a third method of wireless communication.

FIG. 12 is a flow chart 700 of a third method of wireless communication. The method may be performed by a wireless device, such as for example, the wireless device 402. The method may be performed in order to determine a distance to at least one wireless device in step 602. As shown in FIG. 12, in step 702, the wireless device may receive a broadcast signal from each of the at least one wireless device. Each broadcast signal may include a location (e.g., GPS location) of a corresponding wireless device of the at least one wireless device. In step 704, the wireless device may determine its current location (e.g., through GPS). In step 706, the wireless device may then compare the current location with the location of the corresponding wireless device to determine the distance to the corresponding wireless device.

Figure 13:
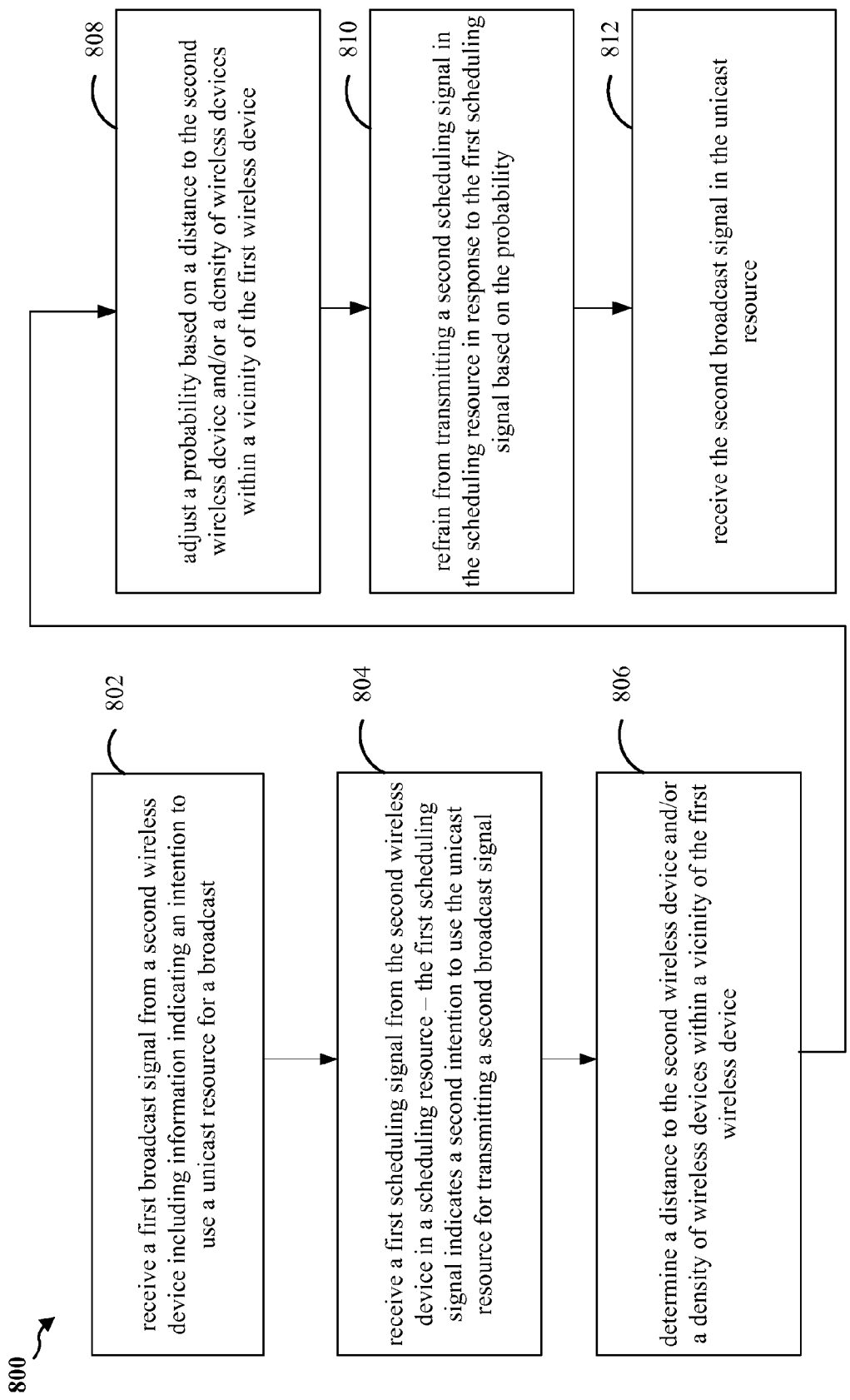
FIG. 13 is a flow chart of a fourth method of wireless communication.

FIG. 13 is a flow chart 800 of a fourth method of wireless communication. The method may be performed by a wireless device, such as for example, the wireless device 406. As shown in FIG. 13, in step 802, a first wireless device may receive a first broadcast signal (e.g., the signal 452) from a second wireless device (e.g., the wireless device 402) including information indicating an intention to use a unicast resource for a broadcast. In step 804, the first wireless device may receive a first scheduling signal (e.g., in the Tx phase, the signal 456) from the second wireless device in a scheduling resource. The first scheduling signal may indicate a second intention to use the unicast resource for transmitting a second broadcast signal. In step 806, the first wireless device may determine a distance to the second wireless device and/or a density of wireless devices within a vicinity of the first wireless device. In step 808, the first wireless device may adjust a probability for determining whether to refrain from transmitting a second scheduling signal (e.g., in the Rx phase) in response to the first scheduling signal based on the determined distance and/or the density. For example, as the distance between the first and second wireless devices decreases, the first wireless device may increase a probability of refraining from transmitting the second scheduling signal in response to the first scheduling signal. For another example, as the density of wireless devices within the vicinity of the first wireless device increases, the first wireless device may increase a probability of refraining from transmitting the second scheduling signal in response to the first scheduling signal.

As discussed supra, the first wireless device may refrain from transmitting the second scheduling signal based on a probability and the probability may be based on at least one of a distance to the second wireless device or a density of wireless devices within the vicinity of the first wireless device. The first wireless device may adjust the probability based on the distance to the second wireless device. In such a configuration, the first wireless device may refrain from transmitting the second scheduling signal with the probability. For example, the first wireless device may increase the probability of refraining from transmitting in the Rx phase the closer it gets to the second wireless device. The first wireless device may adjust the probability based on the density of wireless devices within the vicinity of the first wireless device. In such a configuration, the first wireless device may refrain from transmitting the second scheduling signal with the probability. For example, the first wireless device may increase the probability of refraining from transmitting in the Rx phase the higher the density of wireless devices around the first wireless device.

In step 810, the wireless device may refrain from transmitting the second scheduling signal (e.g., in the Rx phase) in the scheduling resource in response to the first scheduling signal based on the probability. In step 812, the wireless device may receive the second broadcast signal in the unicast resource. The first broadcast signal may further include a broadcast message. The information indicating the intention to use the unicast resource for the broadcast may include information indicating the unicast resource that will be used for the broadcast. The unicast resource may include a plurality of unicast resources.

Figure 14:
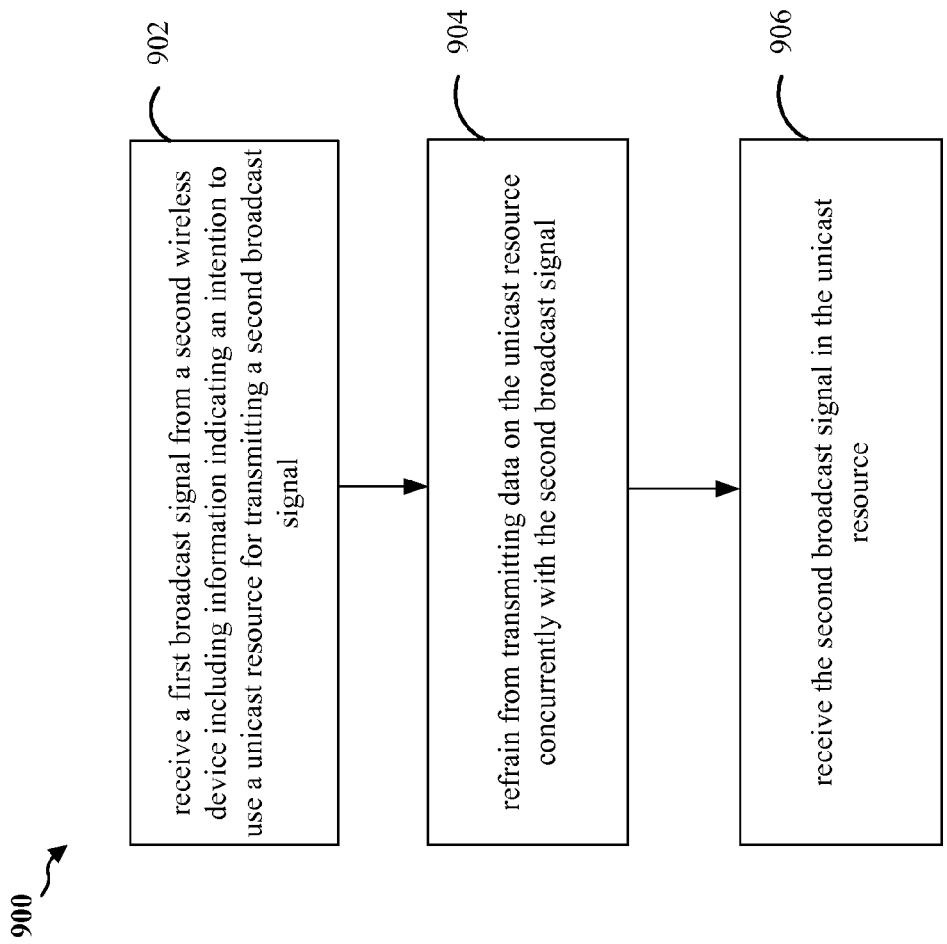
FIG. 14 is a flow chart of a fifth method of wireless communication.

FIG. 14 is a flow chart 900 of a fifth method of wireless communication. The method may be performed by a wireless device, such as for example, the wireless device 416. As shown in FIG. 14, in step 902, a first wireless device may receive a first broadcast signal (e.g., the signal 452) from a second wireless device (e.g., the wireless device 402). The first broadcast signal may include information indicating an intention to use a unicast resource for transmitting a second broadcast signal (e.g., the signal 454). In step 904, the first wireless device may refrain from transmitting data on the unicast resource concurrently with the second broadcast signal. In step 906, the first wireless device may receive the second broadcast signal in the unicast resource.

The first broadcast signal may further include a broadcast message. The information indicating the intention to use the unicast resource for the broadcast may include information indicating the unicast resource that will be used for the broadcast. The unicast resource may include a plurality of unicast resources.

Figure 15:
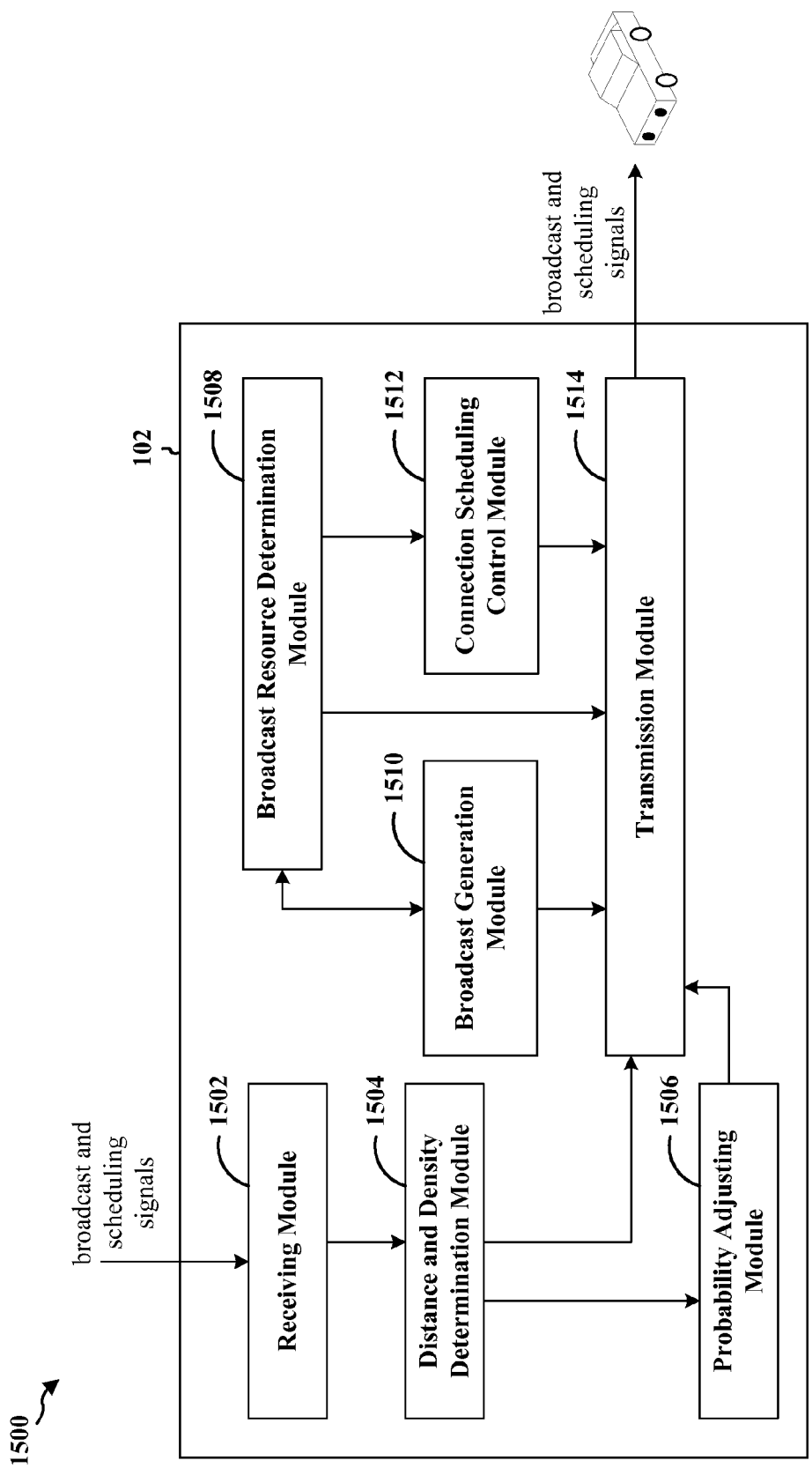
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 102. The apparatus 102 may include at least one of a receiving module 1502, a distance and density determination module 1504, a probability adjusting module 1506, a broadcast resource determination module 1508, a broadcast generation module 1510, a connection scheduling control module 1512, and a transmission module 1514.

The broadcast generation module 1510 may be configured to generate broadcast information and provide the broadcast resource determination module 1508 with the broadcast information. Based on the broadcast information, the broadcast resource determination module 1508 may be configured to determine whether to utilize a unicast resource for transmitting a second broadcast signal with a portion of the broadcast information. The broadcast resource determination module 1508 may be configured to inform the broadcast generation module 1510 to generate a first broadcast signal including information indicating an intention to use the unicast resource for a broadcast. The broadcast generation module 1510 may be configured to provide the first broadcast signal to the transmission module 1514, which may be configured to transmit the first broadcast signal. The broadcast generation module 1510 may be configured to generate a second broadcast signal including additional broadcast information that needs to be transmitted with low latency and to provide the second broadcast signal to the transmission module 1514, which may be configured to transmit the second broadcast signal in the unicast resource.

The transmission module 1514 may be configured to communicate a second intention to use the unicast resource in a scheduling resource (e.g., Tx) of a plurality of scheduling resources. The transmission module 1514 may be configured to communicate the second intention through transmitting a second scheduling signal in connection scheduling resources indicated by the connection scheduling control module 1512. The distance and density determination module 1504 may be configured to determine a distance to at least one wireless device. The determined distance may be provided to the transmission module 1514, which may be configured to determine whether to transmit the second scheduling signal for the at least one wireless device based on whether the distance is less than a threshold distance. The distance and density determination module 1504 may be configured to determine a density of wireless devices within a vicinity of each of the at least one wireless device within the threshold distance and to provide the determined density to the transmission module 1514. The transmission module 1514 may be configured to transmit the second scheduling signal only when the density is greater than a density threshold for any of the at least one wireless device.

The receiving module 1502 may be configured to receive a broadcast signal from each of the at least one wireless device. Each broadcast signal may include a location of a corresponding wireless device. The receiving module 1502 may provide the broadcast signal to the distance and density determination module 1504, which may be configured to determine a current location and to compare the current location with the location of the corresponding wireless device to determine the distance to the corresponding wireless device. The transmission module 1514 may be configured to communicate an intention to communicate the second intention to use the unicast resource. To communicate an intention to communicate the second intention to use the unicast resource, the transmission module 1514 may be configured to transmit a first scheduling signal (e.g., Txp) indicating an intention to transmit a second scheduling signal (e.g., Tx).

The receiving module 1502 may be configured to receive a first broadcast signal from a second wireless device including information indicating an intention to use a unicast resource for a broadcast. The receiving module 1502 may be configured to receive a first scheduling signal from the second wireless device in a scheduling resource. The first scheduling signal may indicate a second intention to use the unicast resource for transmitting a second broadcast signal. The probability adjusting module 1506 may be configured to adjusting a probability of transmitting/refraining from transmitting a second scheduling signal in response to the first scheduling signal based on the distance to the second wireless device and/or the density of wireless devices within the vicinity of the first wireless device. The probability adjusting module 1506 may be configured to provide the adjusted probability to the transmission module 1514, which may be configured to refrain from transmitting the second scheduling signal in the scheduling resource in response to the first scheduling signal based on the probability. The receiving module 1502 may be configured to receive the second broadcast signal in the unicast resource.

The receiving module 1502 may be configured to receive a first broadcast signal from a second wireless device. The first broadcast signal may include information indicating an intention to use a unicast resource for transmitting a second broadcast signal. The receiving module 1502 may be configured to receive the second broadcast signal in the unicast resource. The transmission module 1514 may be configured to refrain from transmitting data on the unicast resource concurrently with the second broadcast signal.

The apparatus may include additional modules that perform each of the steps of the algorithm in the aforementioned flow charts. As such, each step in the aforementioned flow charts may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
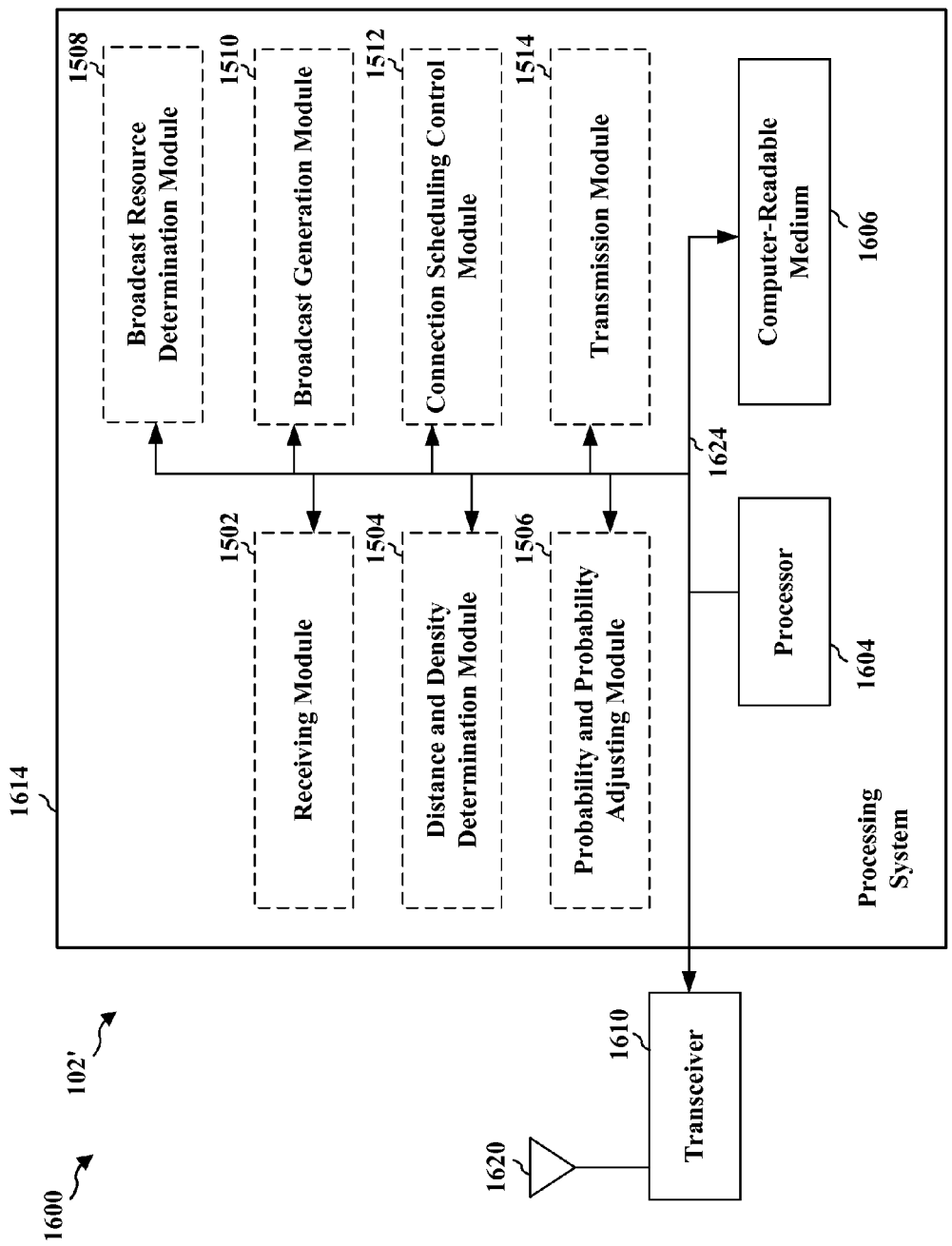
FIG. 16 is a diagram illustrating an example of a hardware implementation for an apparatus employing a processing system.

FIG. 16 is a diagram illustrating an example of a hardware implementation for an apparatus 102' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1502-1514, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1502-1514. The modules may be software modules running in the processor 1604, resident/stored in the computer readable medium 1606, one or more hardware modules coupled to the processor 1604, or some combination thereof.

In one configuration, the apparatus 102/102' for wireless communication includes means for transmitting a first broadcast signal including information indicating an intention to use a unicast resource for a broadcast. The apparatus further includes means for transmitting a second broadcast signal in the unicast resource. The apparatus may further include means for determining to utilize the unicast resource for transmitting the second broadcast signal due to a need to transmit additional broadcast information. The apparatus may further include means for communicating a second intention to use the unicast resource in a scheduling resource of a plurality of scheduling resources. The apparatus may further include means for determining a distance to at least one wireless device, and means for transmitting a second scheduling signal for the at least one wireless device when the distance is less than a threshold distance. The apparatus may further include means for determining a density of wireless devices within a vicinity of each of the at least one wireless device within the threshold distance. The second scheduling signal may be transmitted only when the density is greater than a density threshold for any of the at least one wireless device. The means for determining the distance may include means for receiving a broadcast signal from each of the at least one wireless device. Each broadcast signal may include a location of a corresponding wireless device. The means for determining the distance may further include means for determining a current location, and means for comparing the current location with the location of the corresponding wireless device to determine the distance to the corresponding wireless device. The apparatus may further include means for communicating an intention to communicate the second intention to use the unicast resource. The aforementioned means may be one or more of the aforementioned modules of the apparatus 102 and/or the processing system 1614 of the apparatus 102' configured to perform the functions recited by the aforementioned means.

In one configuration, the apparatus 102/102' for wireless communication includes means for receiving a first broadcast signal from a second apparatus including information indicating an intention to use a unicast resource for a broadcast. The apparatus further includes means for receiving a first scheduling signal from the second apparatus in a scheduling resource. The first scheduling signal may indicate a second intention to use the unicast resource for transmitting a second broadcast signal. The apparatus further includes means for refraining from transmitting a second scheduling signal in the scheduling resource in response to the first scheduling signal. The apparatus may further include means for adjusting a probability for refraining from transmitting the second scheduling signal based on the distance to the second apparatus. The means for refraining may refrain from transmitting the second scheduling signal with the probability. The apparatus may further include means for adjusting the probability based on the density of wireless devices within the vicinity of the apparatus. The means for refraining may refrain from transmitting the second scheduling signal with the probability. The apparatus may further include means for receiving the second broadcast signal in the unicast resource. The aforementioned means may be one or more of the aforementioned modules of the apparatus 102 and/or the processing system 1614 of the apparatus 102' configured to perform the functions recited by the aforementioned means.

In one configuration, the apparatus 102/102' for wireless communication includes means for receiving a first broadcast signal from a second apparatus including information indicating an intention to use a unicast resource for transmitting a second broadcast signal. The apparatus further includes means for refraining from transmitting data on the unicast resource concurrently with the second broadcast signal. The apparatus may further include means for receiving the second broadcast signal in the unicast resource. The aforementioned means may be one or more of the aforementioned modules of the apparatus 102 and/or the processing system 1614 of the apparatus 102' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   transmitting a first broadcast signal comprising information indicating an intention to use a unicast resource for a broadcast, wherein the unicast resource is designated for unicast transmissions;
   transmitting a second broadcast signal in the unicast resource; and
   communicating a second intention to use the unicast resource in a scheduling resource of a plurality of scheduling resources.

2. The method of claim 1, further comprising determining to utilize the unicast resource for transmitting the second broadcast signal due to a need to transmit additional broadcast information.

3. The method of claim 1, wherein the first broadcast signal further comprises a broadcast message.

4. The method of claim 1, wherein said information indicating the intention to use the unicast resource for the broadcast comprises information indicating the unicast resource that will be used for the broadcast.

5. The method of claim 4, wherein the unicast resource comprises a plurality of unicast resources.

6. The method of claim 1, wherein the plurality of scheduling resources each have a different associated priority and the scheduling resource in which the second intention is transmitted has a highest priority.

7. The method of claim 1, wherein the communicating the second intention to use the unicast resource comprises transmitting a scheduling signal with a power equal to an intended power of the transmission of the second broadcast signal.

8. The method of claim 7, further comprising:
determining a distance to at least one wireless device; and
transmitting a second scheduling signal for the at least one wireless device when the distance is less than a threshold distance.

9. The method of claim 8, further comprising determining a density of wireless devices within a vicinity of each of the at least one wireless device within the threshold distance, wherein the second scheduling signal is transmitted only when the density is greater than a density threshold for any of the at least one wireless device.

10. The method of claim 8, wherein the determining the distance comprises:
receiving a broadcast signal from each of the at least one wireless device, each broadcast signal comprising a location of a corresponding wireless device;
determining a current location; and
comparing the current location with the location of the corresponding wireless device to determine the distance to the corresponding wireless device.

11. The method of claim 1, further comprising communicating an intention to communicate the second intention to use the unicast resource.

12. The method of claim 11, wherein the communicating the intention to communicate the second intention to use the unicast resource comprises transmitting a first scheduling signal indicating an intention to transmit a second scheduling signal.

13. An apparatus for wireless communication, comprising:
means for transmitting a first broadcast signal comprising information indicating an intention to use a unicast resource for a broadcast, wherein the unicast resource is designated for unicast transmissions;
means for transmitting a second broadcast signal in the unicast resource; and
means for communicating a second intention to use the unicast resource in a scheduling resource of a plurality of scheduling resources.

14. The apparatus of claim 13, further comprising means for determining to utilize the unicast resource for transmitting the second broadcast signal due to a need to transmit additional broadcast information.

15. The apparatus of claim 13, wherein the first broadcast signal further comprises a broadcast message.

16. The apparatus of claim 13, wherein said information indicating the intention to use the unicast resource for the broadcast comprises information indicating the unicast resource that will be used for the broadcast.

17. The apparatus of claim 16, wherein the unicast resource comprises a plurality of unicast resources.

18. The apparatus of claim 13, wherein the plurality of scheduling resources each have a different associated priority and the scheduling resource in which the second intention is transmitted has a highest priority.

19. The apparatus of claim 13, wherein the means for communicating the second intention to use the unicast resource transmits a scheduling signal with a power equal to an intended power of the transmission of the second broadcast signal.

20. The apparatus of claim 19, further comprising:
means for determining a distance to at least one wireless device; and
means for transmitting a second scheduling signal for the at least one wireless device when the distance is less than a threshold distance.

21. The apparatus of claim 20, further comprising means for determining a density of wireless devices within a vicinity of each of the at least one wireless device within the threshold distance, wherein the second scheduling signal is transmitted only when the density is greater than a density threshold for any of the at least one wireless device.

22. The apparatus of claim 20, wherein the means for determining the distance comprises:
means for receiving a broadcast signal from each of the at least one wireless device, each broadcast signal comprising a location of a corresponding wireless device;
means for determining a current location; and
means for comparing the current location with the location of the corresponding wireless device to determine the distance to the corresponding wireless device.

23. The apparatus of claim 13, further comprising means for communicating an intention to communicate the second intention to use the unicast resource.

24. The apparatus of claim 23, wherein the means for communicating the intention to communicate the second intention to use the unicast resource transmits a first scheduling signal indicating an intention to transmit a second scheduling signal.

25. An apparatus for wireless communication, comprising:
a processing system configured to:
transmit a first broadcast signal comprising information indicating an intention to use a unicast resource for a broadcast, wherein the unicast resource is designated for unicast transmissions;
transmit a second broadcast signal in the unicast resource; and
communicate a second intention to use the unicast resource in a scheduling resource of a plurality of scheduling resources.

26. The apparatus of claim 25, wherein the processing system is further configured to utilize the unicast resource for transmitting the second broadcast signal due to a need to transmit additional broadcast information.

27. The apparatus of claim 25, wherein the first broadcast signal further comprises a broadcast message.

28. The apparatus of claim 25, wherein said information indicating the intention to use the unicast resource for the broadcast comprises information indicating the unicast resource that will be used for the broadcast.

29. The apparatus of claim 28, wherein the unicast resource comprises a plurality of unicast resources.

30. The apparatus of claim 25, wherein the plurality of scheduling resources each have a different associated priority and the scheduling resource in which the second intention is transmitted has a highest priority.

31. The apparatus of claim 25, wherein the processing system is configured to communicate the second intention to use the unicast resource by transmitting a scheduling signal with a power equal to an intended power of the transmission of the second broadcast signal.

32. The apparatus of claim 31, wherein the processing system is further configured to:
determine a distance to at least one wireless device; and
transmit a second scheduling signal for the at least one wireless device when the distance is less than a threshold distance.

33. The apparatus of claim 32, wherein the processing system is further configured to determine a density of wireless devices within a vicinity of each of the at least one wireless device within the threshold distance, wherein the second scheduling signal is transmitted only when the density is greater than a density threshold for any of the at least one wireless device.

34. The apparatus of claim 32, wherein to determine the distance, the processing system is configured to:
   receive a broadcast signal from each of the at least one wireless device, each broadcast signal comprising a location of a corresponding wireless device;
   determine a current location; and
   compare the current location with the location of the corresponding wireless device to determine the distance to the corresponding wireless device.

35. The apparatus of claim 25, wherein the processing system is further configured to communicate an intention to communicate the second intention to use the unicast resource.

36. The apparatus of claim 35, wherein the processing system is configured to communicate the intention to communicate the second intention to use the unicast resource by transmitting a first scheduling signal indicating an intention to transmit a second scheduling signal.

37. A computer program product, comprising:
   a non-transitory computer-readable medium comprising code for:
      transmitting a first broadcast signal comprising information indicating an intention to use a unicast resource for a broadcast, wherein the unicast resource is designated for unicast transmissions;
      transmitting a second broadcast signal in the unicast resource; and
      communicating a second intention to use the unicast resource in a scheduling resource of a plurality of scheduling resources.

38. The method of claim 1,
   wherein the transmitting the first broadcast signal comprising information indicating the intention to use the unicast resource for the broadcast comprises transmitting the first broadcast signal from a first wireless device to all other wireless devices within a preselected range of the first wireless device.

39. The apparatus of claim 13,
   wherein the means for transmitting the first broadcast signal comprising information indicating the intention to use the unicast resource for the broadcast comprises means for transmitting the first broadcast signal from a first wireless device to all other wireless devices within a preselected range of the first wireless device.

40. The apparatus of claim 25,
   wherein the processing system is further configured to transmit the first broadcast signal from a first wireless device to all other wireless devices within a preselected range of the first wireless device.

* * * * *